United States Patent
Sun

(10) Patent No.: US 8,211,306 B2
(45) Date of Patent: Jul. 3, 2012

(54) BIOTRICKLING FILTER TREATMENT METHOD UTILIZING WASTE TIRES AND A BIOTRICKLING FILTER TREATMENT TANK THEREOF

(76) Inventor: Hsu-Hsien Sun, Chiayi County (TW)

( * ) Notice: Subject to any disclaimer, the term of this patent is extended or adjusted under 35 U.S.C. 154(b) by 238 days.

(21) Appl. No.: 12/633,955

(22) Filed: Dec. 9, 2009

(65) Prior Publication Data

US 2011/0132820 A1 Jun. 9, 2011

(51) Int. Cl.
*C02F 3/04* (2006.01)
(52) U.S. Cl. .......................... 210/615; 210/150
(58) Field of Classification Search .................. 210/150, 210/151, 615, 617
See application file for complete search history.

(56) References Cited

U.S. PATENT DOCUMENTS

| | | | | |
|---|---|---|---|---|
| 2,308,866 A * | 1/1943 | Dekema | ......................... | 210/617 |
| 2,391,494 A * | 12/1945 | Walker | .......................... | 210/617 |
| 3,730,881 A * | 5/1973 | Armstrong | ..................... | 210/615 |
| 4,225,431 A * | 9/1980 | De Longe | ....................... | 210/151 |
| 4,662,900 A * | 5/1987 | Ottengraf | ....................... | 210/615 |
| 5,976,377 A * | 11/1999 | Hyfantis et al. | .............. | 210/150 |
| 6,207,057 B1 * | 3/2001 | White | ........................... | 210/615 |
| 6,428,691 B1 * | 8/2002 | Wofford | ........................ | 210/151 |
| 7,244,355 B2 * | 7/2007 | Green | ........................... | 210/150 |

* cited by examiner

*Primary Examiner* — Christopher Upton
(74) *Attorney, Agent, or Firm* — Alan Kamrath; Kamrath IP Lawfirm, PA

(57) ABSTRACT

A biotrickling filter treatment method includes the steps of: arranging waste tires in an organic treatment area to form at least one waste tire array; forming biological membranes on the waste tire array; and circulating wastewater in the organic treatment area to pass through the waste tire array and ventilating the organic treatment area. The biotrickling filter treatment tank includes an organic treatment area, a waste tire array and a sprayer unit. The waste tire array is formed from a plurality of waste tires on which to form biological membranes and is provided in the organic treatment area. The sprayer unit is aligned with the waste tire array to spray wastewater on the waste tires for wastewater treatment.

20 Claims, 4 Drawing Sheets

BIOTRICKLING FILTER TREATMENT METHOD UTILIZING WASTE TIRES AND A BIOTRICKLING FILTER TREATMENT TANK THEREOF

BACKGROUND OF THE INVENTION

1. Field of the Invention

The present invention relates to a biotrickling filter treatment method and a biotrickling filter treatment tank utilizing waste tires. More particularly, the present invention relates to the biotrickling filter treatment method and biotrickling filter treatment tank utilizing waste tires stacked to form biological membrane units.

2. Description of the Related Art

In general, a biotrickling filter treatment method is well known in the art, and is similar to an activated sludge method. The biotrickling filter treatment method utilizes a filter bed containing microorganisms for treating wastewater. The wastewater can be mixed by fresh air (i.e. oxygen) such that the microorganisms can decompose organic matters contained in the wastewater, performing as biological wastewater treatment. In this manner the wastewater is treated and sewage is clarified so that the water quality may be improved as a standard quality of reusable wastewater.

In wastewater treatment, there is a need of continuously spraying water to circulate wastewater in a biotrickling filter treatment tank so as to avoid still wastewater. In fact, the amount of wastewater must be distributed uniformly in the biotrickling filter treatment tank to avoid the occurrence of localized excess load in biological membranes. Furthermore, some or all of the treated water must be lead into the biotrickling filter treatment tank for reducing the concentration of untreated wastewater, reducing the stink of wastewater, increasing the dissolved oxygen of wastewater, performing the treated water as inoculums and reducing the temperature of wastewater to maintain a suitable thickness of the biological membrane.

Conditions of biological filter materials must be as follows:

1. Surfaces of the biological filter materials are suitable for forming and adhering biological membranes, and microorganisms cannot decompose the biological filter materials or surfaces thereof.

2. The shapes and properties of the biological filter materials allow wastewater flowing over the surfaces of the biological filter materials uniformly for biological treatment.

3. The biological filter materials are made from porous materials and have adequate ventilation holes for supplying fresh air (i.e. oxygen).

When the biological filter materials are immersed in the biotrickling filter treatment tank, biological membranes formed on the surfaces of the biological filter materials will react with the wastewater. The wastewater must be distributed uniformly in the biotrickling filter treatment tank to avoid the occurrence of localized excess load in biological membranes which will obstruct water passages.

As a matter of fact, the biotrickling filter treatment method is possibly capable of combining with other waste processing technologies for improving the efficiency of biological filter treatment and reducing the amount of other waste materials. Accordingly, treatment processes for other waste materials will be also reduced.

Currently, there are a great number of waste tires generated and widely reused. However, usable materials may be produced or manufactured from waste tires. Even though waste tires represent a significant risk to public health, they are not highly toxic materials. There are several waste tire processes, including mechanically chipping, thermal pyrolysis, auxiliary combustion, landfill and manufacturing waste tire products. For example, chipped rubber of waste tires and bitumen mixed in a predetermine ratio to form rubber asphalt are widely used. However, waste tires may be possibly used in biological filter treatment.

As is described in greater detail below, the present invention provides a biotrickling filter treatment method and a biotrickling filter treatment tank utilizing waste tires. Waste tires are stacked to form biological membrane units for biotrickling filter treatment in such a way as to mitigate and overcome the above problems.

SUMMARY OF THE INVENTION

The primary objective of this invention is to provide a biotrickling filter treatment method and a biotrickling filter treatment tank utilizing waste tires. Waste tires are stacked to form biological membrane units for biotrickling filter treatment. Accordingly, the present invention is successful in improving the efficiency of biotrickling filter treatment and reducing the amount of waste tires.

The biotrickling filter treatment method in accordance with an aspect of the present invention includes the steps of:

arranging a plurality of waste tires in an organic treatment area to form at least one waste tire array;

Forming biological membranes on the waste tire array; and circulating wastewater in the organic treatment area to pass through the waste tire array and ventilating the organic treatment area for wastewater treatment.

The biotrickling filter treatment tank in accordance with a separate aspect of the present invention includes an organic treatment area, a waste tire array and a sprayer unit. The waste tire array is formed from a plurality of waste tires which form biological membranes and is provided in the organic treatment area. The sprayer unit is aligned with the waste tire array to spray wastewater on the waste tires for wastewater treatment.

In a separate aspect of the present invention, the biotrickling filter treatment tank further includes an air inlet aligned with the waste tire array to guide air passing through the waste tires.

In a further separate aspect of the present invention, the air inlet is arranged at a bottom portion of the biotrickling filter treatment tank.

In a yet further separate aspect of the present invention, the waste tire array includes a plurality of ventilation holes.

In a yet further separate aspect of the present invention, the ventilation holes are arranged on a side portion of the waste tire.

In a yet further separate aspect of the present invention, two of the ventilation holes have an included angle of 90 degrees or 180 degrees with respect to a center of the waste tire.

In a yet further separate aspect of the present invention, the sprayer unit connects with a pump unit for circulating the wastewater in the organic treatment area.

In a yet further separate aspect of the present invention, the biotrickling filter treatment tank further includes a wastewater circulation unit.

In a yet further separate aspect of the present invention, the biotrickling filter treatment tank includes a wastewater-collecting unit.

In a yet further separate aspect of the present invention, the wastewater circulation unit and the wastewater-collecting unit include an air diffuser.

Further scope of the applicability of the present invention will become apparent from the detailed description given hereinafter. However, it should be understood that the detailed description and specific examples, while indicating preferred embodiments of the invention, are given by way of illustration only, since various modifications will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

It is noted that a biotrickling filter treatment method in accordance with the preferred embodiment of the present invention can be applicable to a single organic wastewater treatment system, or can be arranged at a side or top portion of an aeration tank or a riverside treatment system. In addition, a biotrickling filter treatment tank may be in the form of a single tank structure, a double tank structure, a triple tank structure or a multiple tank structure, which are not limitative of the present invention.

The biotrickling filter treatment method in accordance with the preferred embodiment of the present invention includes the step of: arranging a plurality of waste tires fixed in an organic treatment area in a suitable manner to form at least one waste tire array. The organic treatment area is provided in an interior of a biological treatment tank to contain the waste tire array.

The biotrickling filter treatment method further includes the step of: forming biological membranes on the waste tire array in a suitable manner. In the preferred embodiment, the biological membrane is formed with a predetermined thickness suitable for wastewater treatment.

The biotrickling filter treatment method further includes the step of: circulating wastewater in the organic treatment area to pass through the waste tire array and further ventilating the organic treatment area for biotrickling filter treatment. Accordingly, fresh air can be supplied to the biological membranes formed on the waste tire array.

The biotrickling filter treatment method in accordance with the present invention can be implemented by various biotrickling filter treatment tanks shown in the following embodiments, as will be discussed in greater detail subsequently.

Figure 1:
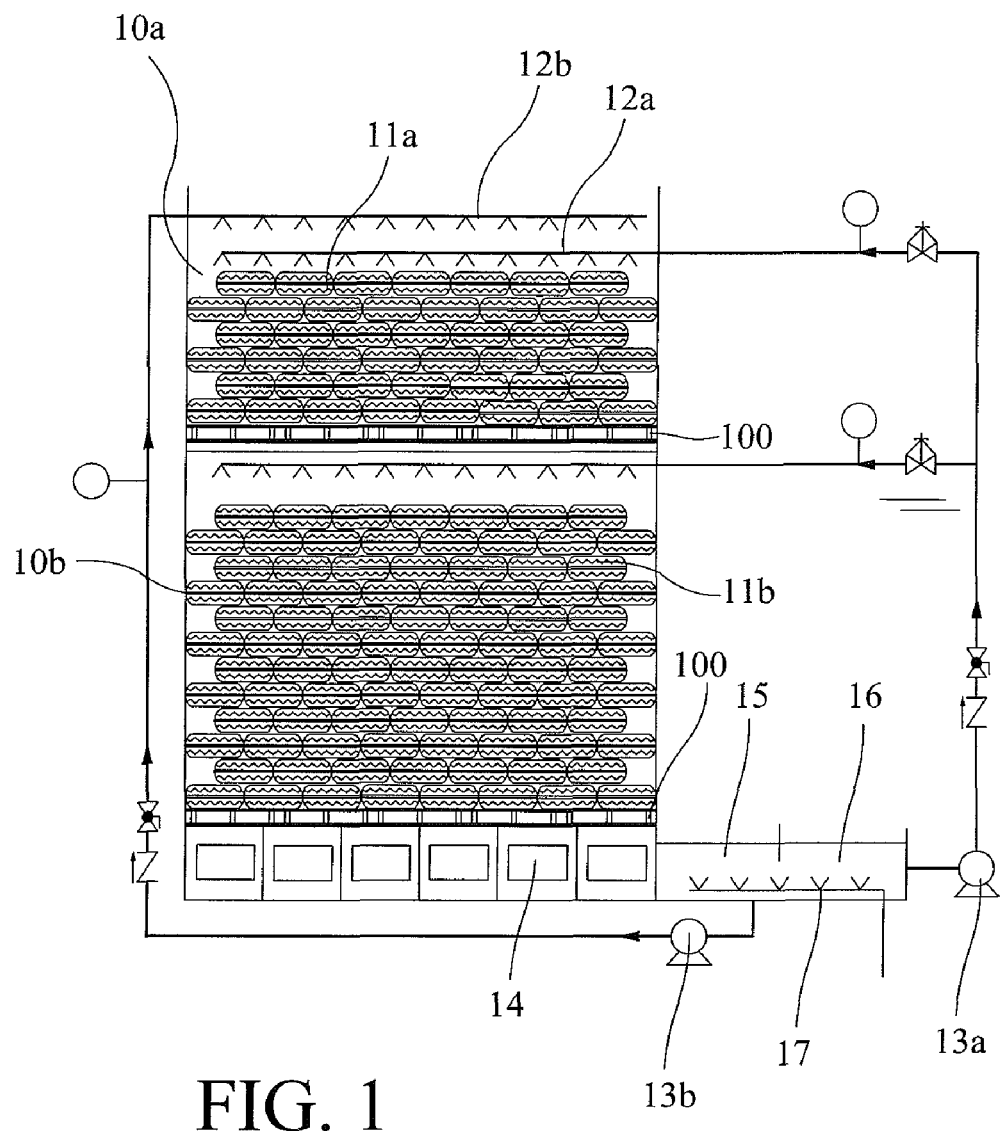
FIG. 1 is a structurally schematic view of a biotrickling filter treatment tank having a double tank structure in accordance with a first preferred embodiment of the present invention.

FIG. 1 shows a structurally schematic view of a double tank structure of the biotrickling filter treatment tank in accordance with a first preferred embodiment of the present invention. With continued reference to FIG. 1, the biotrickling filter treatment tank in accordance with the first preferred embodiment of the present invention includes a first organic treatment area 10a, a second organic treatment area 10b, a first waste tire array 11a provided on a first support 100, a second waste tire array 11b provided on a second support 100, a first sprayer unit 12a, a second sprayer unit 12b, a first pump unit 13a, a second pump unit 13b, a plurality of air inlets 14, a wastewater circulation unit 15, a wastewater-collecting unit 16 and an air diffuser 17. In this preferred embodiment, the biotrickling filter treatment tank may further include other components without departing from the scope of the invention.

Still referring to FIG. 1, the first organic treatment area 10a and the second organic treatment area 10b are arranged at an upper portion and a lower portion of the biotrickling filter treatment tank. The first organic treatment area 10a is utilized to treat ordinary organic materials and volatile organic compounds (VOCs). Correspondingly, the second organic treatment area 10b is only utilized to treat ordinary organic materials. The first waste tire array 11a and the second waste tire array 11b are arranged in the first organic treatment area 10a and the second organic treatment area 10b, respectively.

Still referring to FIG. 1, the first sprayer unit 12a and the second sprayer unit 12b are aligned with the first waste tire array 11a and the second waste tire array 11b, respectively, so as to spray the wastewater to pass through the first waste tire array 11a and the second waste tire array 11b. In this manner, the biological membranes formed on the first waste tire array 11a and the second waste tire array 11b can treat the wastewater with aerobic or anaerobic digest or decomposition. In this preferred embodiment, the first sprayer unit 12a connects with the first pump unit 13a which can circulate the wastewater contained in the wastewater circulation unit 15 and the wastewater-collecting unit 16 to pass through the first waste tire array 11a and the second waste tire array 11b. Correspondingly, the second sprayer unit 12b connects with a second pump unit 13b which can circulate the wastewater contained in the wastewater circulation unit 15 and the wastewater-collecting unit 16 to pass through the first waste tire array 11a and the second waste tire array 11b.

Referring again to FIG. 1, the air inlets 14 are aligned with one of the first waste tire array 11a and the second waste tire array 11b to guide fresh air passing through the first waste tire array 11a and the second waste tire array 11b such that fresh air can be forced or naturally supplied for biologically decomposing organic materials. In a preferred embodiment, a series of the air inlets 14 are arranged at a bottom position of the second waste tire array 11b. In anther preferred embodiment, the air inlet 14 is combined with an air-driving unit (e.g. air fan), which is not limitative of the present invention, used to force fresh air passing through the first waste tire array 11a and the second waste tire array 11b.

With continued reference to FIG. 1, the wastewater circulation unit 15 and the wastewater-collecting unit 16 include an air diffuser 17 provided therein. In operation, the air diffuser 17 can mix air with the wastewater. Connected between the wastewater circulation unit 15 and the wastewater-collecting unit 16 is a water passage such that the circulated organic wastewater and the untreated wastewater are mixed to form a wastewater mixture.

Still referring to FIG. 1, in wastewater treatment, the first pump unit 13a and the second pump unit 13b are operated to suck the wastewater contained in the wastewater circulation unit 15 and the wastewater-collecting unit 16. The first sprayer unit 12a and the second sprayer unit 12b are capable of spraying wastewater on the first waste tire array 11a and the second waste tire array 11b. Synchronously, fresh air via the air inlet 14 may pass through the first waste tire array 11a and the second waste tire array 11b. Finally, the wastewater flows into the wastewater circulation unit 15.

Figure 2A:
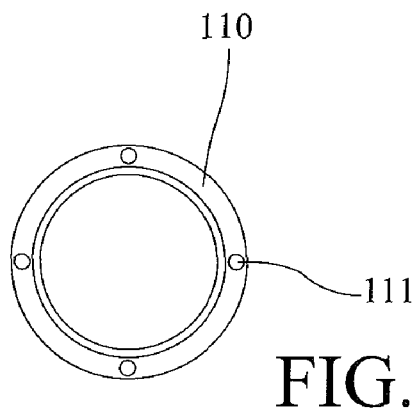
FIG. 2A is a top schematic view of a single waste tire of the waste tire array arranged in the biotrickling filter treatment tank in accordance with the first preferred embodiment of the present invention, depicted in FIG. 2.
Figure 2:
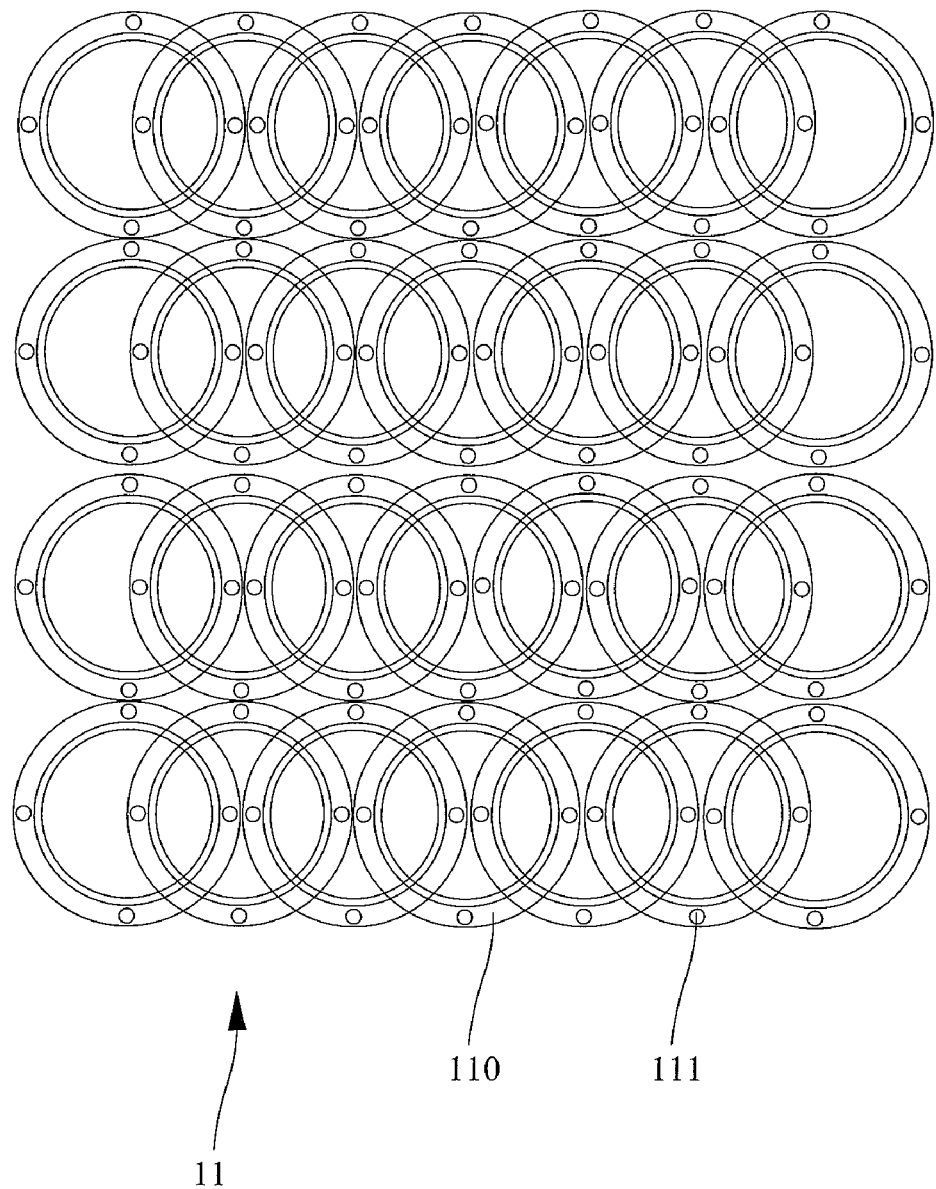
FIG. 2 is a top schematic view of a waste tire array arranged in the biotrickling filter treatment tank in accordance with the first preferred embodiment of the present invention, depicted in FIG. 1.

FIG. 2 shows a top schematic view of a waste tire array arranged in the biotrickling filter treatment tank in accordance with the first preferred embodiment of the present invention. Referring to FIG. 2, waste tires 110 are stacked to form the waste tire array 11. The biological membranes can be formed on both of the inner surface and the outer surface of the waste tire 110. The stacked waste tires 110 are not in alignment with each other. For example, when two of the waste tires 110 are stacked, centers of the waste tires 110 are not in alignment with each other. In a preferred embodiment, the waste tire array 11 has a height ranging between 300 cm and 450 cm, which is not limitative of the present invention.

FIG. 2A shows a top schematic view of a single waste tire of the waste tire array 11 arranged in the biotrickling filter treatment tank in accordance with the first preferred embodiment of the present invention. Referring to FIGS. 2 and 2A, the waste tire 110 has four ventilation holes 111 formed on a sidewall thereof for biotrickling filter treatment. Apparently, four other corresponding ventilation holes 111 are formed on an opposite sidewall of the waste tire 110. The ventilation holes 111 provided on the sidewalls surround a center of the waste tire 110. In a preferred embodiment, the two ventilation holes 111 have an included angle of 90 degrees or 180 degrees with respect to the center of the waste tire 110. The ventilation hole 111 has a diameter ranging between 4.5 cm and 5.0 cm.

Referring again to FIG. 2, when stacked, the sidewall of the waste tire 110 will not obstruct the ventilation holes 111 of the adjacent waste tire 110. Accordingly, the biotrickling filter treatment tank is successful in supplying the wastewater and air to pass through the interiors of the waste tire 110. On the other hand, the wastewater and air can be released from the interior of the waste tire 110 via the ventilation holes 111.

Figure 3:
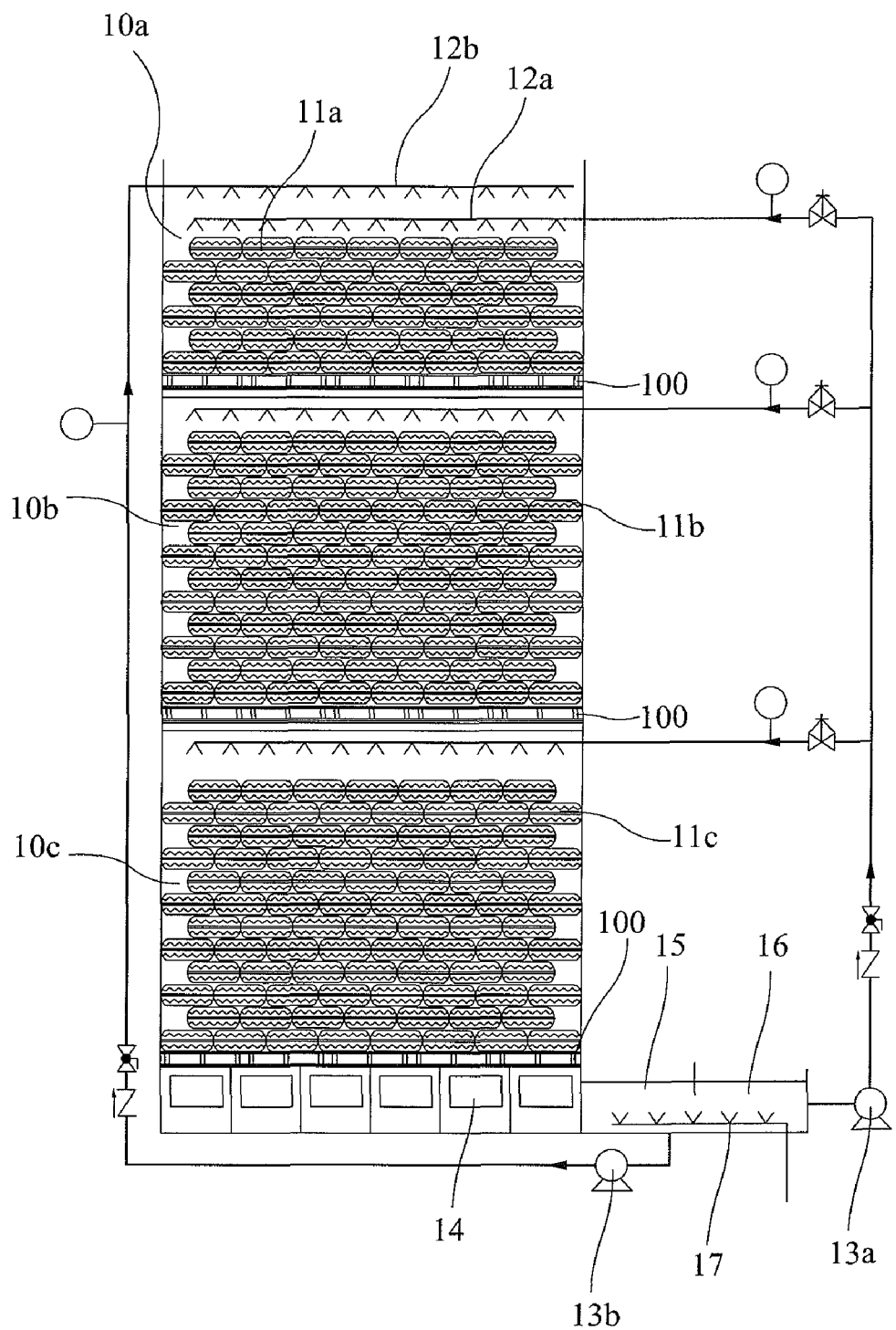
FIG. 3 is a structurally schematic view, similar to FIG. 1, of the biotrickling filter treatment tank having a triple tank structure in accordance with a second preferred embodiment of the present invention.

FIG. 3 shows a structurally schematic view of the biotrickling filter treatment tank having a triple tank structure in accordance with a second preferred embodiment of the present invention. Reference numerals of the second embodiment of the present invention have applied the identical numerals of the first embodiment, as best shown in FIG. 1. With continued reference to FIG. 3, the triple tank structure of the biotrickling filter treatment tank in accordance with the second preferred embodiment of the present invention includes a first organic treatment area 10a, a second organic treatment area 10b, a third organic treatment area 10c, a first waste tire array 11a, a second waste tire array 11b, a third waste tire array 11c, a first sprayer unit 12a, a second sprayer unit 12b, a first pump unit 13a, a second pump unit 13b, a plurality of air inlets 14, a wastewater circulation unit 15, a wastewater-collecting unit 16 and an air diffuser 17.

Referring again to FIGS. 1 and 3, in comparison with the first embodiment, added in the biotrickling filter treatment tank of the second embodiment are the third organic treatment area 10c and the third waste tire array 11c. Other constructions of the biotrickling filter treatment tank in accordance with the second embodiment have similar configurations and same functions as those of the first embodiment, and detailed descriptions may be omitted.

Figure 4:
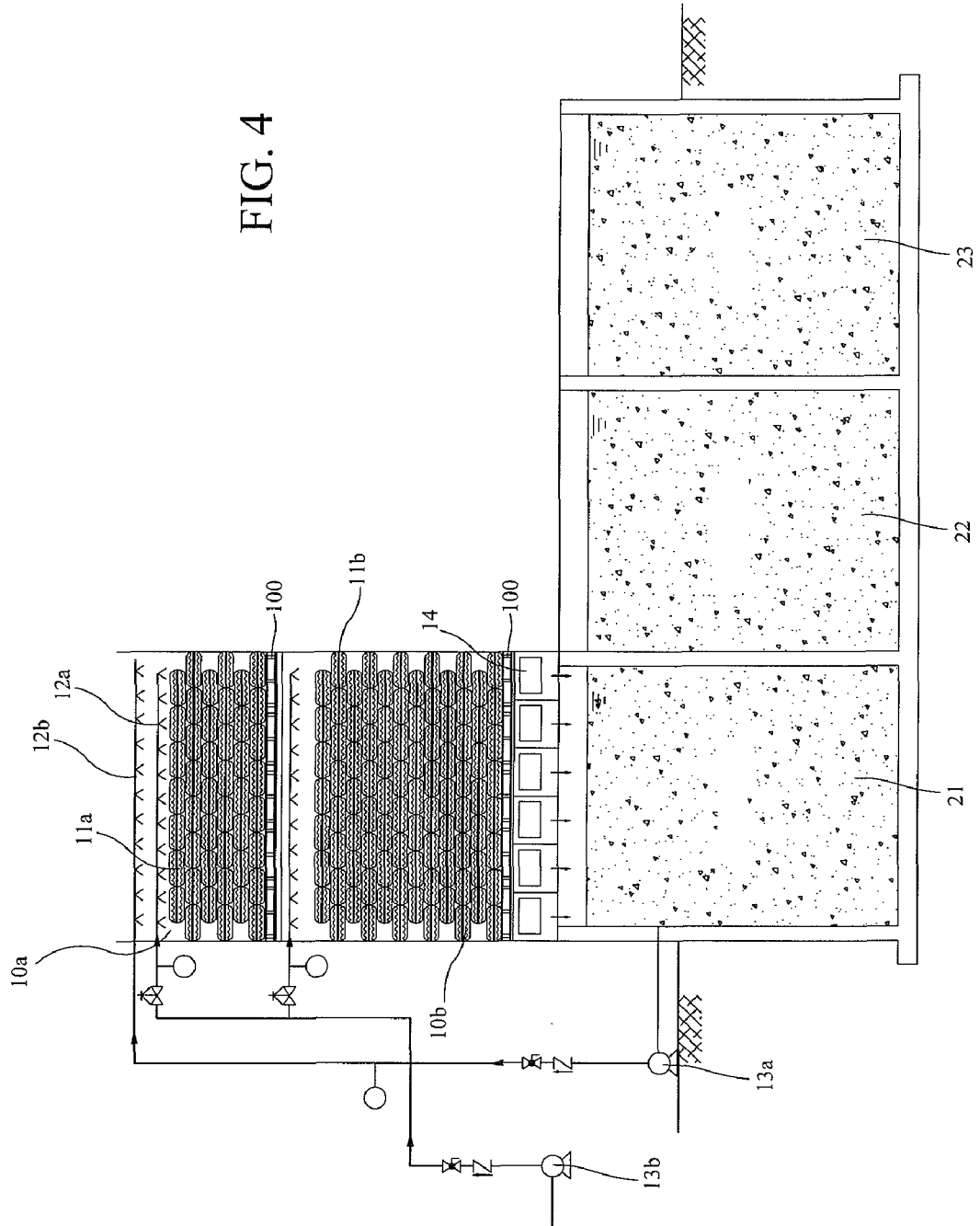
FIG. 4 is a structurally schematic view of the biotrickling filter treatment tank having a double tank structure combined with a series of aeration tanks in accordance with a third preferred embodiment of the present invention.

FIG. 4 shows a structurally schematic view of the biotrickling filter treatment tank having a double tank structure combined with a series of aeration tanks in accordance with a third preferred embodiment of the present invention. With continued reference to FIG. 4, the biotrickling filter treatment tank of the third embodiment of the present invention is arranged on a first aeration tank 21 which further connects with a second aeration tank 22 and a third aeration tank 23.

Still referring to FIG. 4, the double tank structure of the biotrickling filter treatment tank in accordance with the third preferred embodiment of the present invention includes a first organic treatment area 10a, a second organic treatment area 10b, a first waste tire array 11a, a second waste tire array 11b, a first sprayer unit 12a, a second sprayer unit 12b, a first pump unit 13a, a second pump unit 13b and a plurality of air inlet inlets 14.

Referring again to FIGS. 1 and 4, in comparison with the first embodiment, the double tank structure of the constructions of the biotrickling filter treatment tank in accordance with the third embodiment has similar configurations and the same functions as those of the first embodiment, and detailed descriptions may be omitted.

Although the invention has been described in detail with reference to its presently preferred embodiments, it will be understood by one of ordinary skill in the art that various modifications can be made without departing from the spirit and the scope of the invention, as set forth in the appended claims.

What is claimed is:

1. A biotrickling filter treatment method comprising:
    arranging a plurality of waste tires in an organic treatment area to form a waste tire array on a support, with each waste tire including first and second side portions extending radially inwardly from opposite ends of a circumferential tread portion, with the first and second side portions of the plurality of waste tires being parallel in the waste tire array, wherein a plurality of ventilation holes are arranged in the first and second side portions of each waste tire of the waste tire array;
    forming biological membranes on the waste tire array; and
    circulating wastewater in the organic treatment area to pass through the waste tire array and the plurality of ventilation holes and ventilating the organic treatment area for wastewater treatment.

2. The biotrickling filter treatment method as defined in claim 1, further comprising using an air inlet to guide air passing through the waste tire array.

3. The biotrickling filter treatment method as defined in claim 1, wherein two of the plurality of ventilation holes have an included angle of 90 degrees or 180 degrees with respect to a center of each waste tire.

4. The biotrickling filter treatment method as defined in claim 1, wherein circulating wastewater comprises using a sprayer unit to circulate the wastewater.

5. The biotrickling filter treatment method as defined in claim 4, further comprising connecting the sprayer unit with a pump unit.

6. The biotrickling filter treatment method of claim 1 further comprising arranging another waste tire array abutting the waste tire array in the organic treatment area, with centers of the plurality of waste tires of the waste tire array not being in alignment with centers of the plurality of waste tires of the other waste tire array.

7. The biotrickling filter treatment method of claim 1 further comprising arranging the plurality of ventilation holes in the first side portion in alignment or mis-alignment with those arranged in the second side portion.

8. A biotrickling filter treatment system comprising:

an organic treatment area in a biotrickling filter treatment tank;

a waste tire array provided on a support and formed from a plurality of waste tires forming biological membranes, with each waste tire including first and second side portions extending radially inwardly from opposite ends of a circumferential tread portion, with the first and second side portions of the plurality of waste tires being parallel in the waste tire array, wherein a plurality of ventilation holes are arranged in the first and second side portions of each waste tire of the waste tire array, with the waste tire array provided in the organic treatment area; and a sprayer unit spraying wastewater on the waste tires for wastewater treatment.

9. The biotrickling filter treatment system as defined in claim 8, wherein the biotrickling filter treatment tank further includes an air inlet aligned with the waste tire array to guide air passing through the plurality of waste tires.

10. The biotrickling filter treatment system as defined in claim 9, wherein the air inlet is arranged at a bottom portion of the biotrickling filter treatment tank.

11. The biotrickling filter treatment system as defined in claim 8, wherein two of the plurality of ventilation holes have an included angle of 90 degrees or 180 degrees with respect to a center of each waste tire.

12. The biotrickling filter treatment system as defined in claim 11, wherein the biotrickling filter treatment tank further includes a wastewater circulation unit.

13. The biotrickling filter treatment system as defined in claim 8, wherein the sprayer unit circulates the wastewater.

14. The biotrickling filter treatment system as defined in claim 13, wherein the sprayer unit connects with a pump unit.

15. The biotrickling filter treatment system as defined in claim 8, wherein the biotrickling filter treatment tank includes a wastewater-collecting unit.

16. The biotrickling filter treatment system as defined in claim 8, wherein the biotrickling filter treatment tank includes an air diffuser connected with a wastewater circulation unit and a wastewater-collecting unit.

17. The biotrickling filter treatment system as defined in claim 8, wherein the biotrickling filter treatment tank has a single tank structure, a double tank structure or a triple tank structure.

18. The biotrickling filter treatment system as defined in claim 8, wherein the biotrickling filter treatment tank connects with an aeration tank.

19. The biotrickling filter treatment system of claim 8 further comprising another waste tire array formed from a plurality of waste tires forming biological members abutting with the waste tire array, with centers of the plurality of waste tires of the waste tire array not being in alignment with centers of the plurality of waste tires of the other waste tire array.

20. The biotrickling filter treatment system of claim 8, wherein the plurality of ventilation holes arranged in the first side portion is in alignment or mis-alignment with those arranged in the second side portion.

* * * * *